United States Patent

[11] 3,621,061

[72] Inventors  Pal Benko;
　　　　　　　Zoltan Budai; Laszlo Pallos, all of
　　　　　　　Budapest, Hungary
[21] Appl. No.  815,503
[22] Filed　　　Apr. 11, 1969
[45] Patented　Nov. 16, 1971
[73] Assignee　Egyesult Gyogyszer es Tapszergyar
　　　　　　　Budapest, Hungary
[32] Priority　　Apr. 12, 1968
[33]　　　　　　Hungary
[31]　　　　　　EE-1507

[54] NEW FORMAMIDINE DERIVATIVES AND
　　　PROCESS FOR THE PREPARATION THEREOF
　　　4 Claims, No Drawings
[52] U.S. Cl. .................................................. 260/564 R,
　　　　　　　　　　　　　　　　　　　260/501.14, 260/999
[51] Int. Cl. ....................................................C07e123/00
[50] Field of Search .......................................... 260/564 R

[56]　　　　　References Cited
　　　　　　UNITED STATES PATENTS
3,445,517　5/1969　Mills............................. 260/564

OTHER REFERENCES
Shriner et al., Chem. Rev., Vol. 35, pp. 372–373 (1944)

Primary Examiner—Leon Zitver
Assistant Examiner—Gerald A. Schwartz
Attorney—Young & Thompson ABSTRACT: Compounds of the general formula I and their acid addition salts

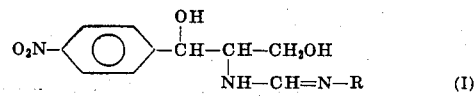

wherein R stands for a member selected from the group consisting of unsubstituted phenyl, substituted phenyl, and naphthyl radicals, wherein the substituent of the phenyl group is selected from the group consisting of halogen, lower alkyl, lower alkoxy, trihalomethyl, nitro group, and a combination thereof, wherein the halogen substituent may be one or two halogen atoms. These compounds have antimicrobial effect.

NEW FORMAMIDINE DERIVATIVES AND PROCESS FOR THE PREPARATION THEREOF

This invention relates to new organic compounds. More particularly it is concerned with therapeutically active formamidine derivatives, a process for the preparation thereof and pharmaceutical compositions containing same as active ingredient.

According to a feature of the present invention there are provided new formamidine derivatives having the general formula I and their acid addition salts with pharmaceutically acceptable acids:

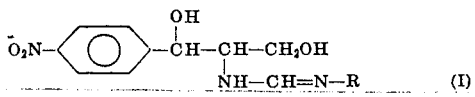
(I)

wherein R stands for a member selected from the group consisting of unsubstituted phenyl, substituted phenyl, and naphthyl radicals, wherein the substituent of the phenyl group is selected from the group consisting of halogen, lower alkyl, lower alkoxy, trihalomethyl, nitro group, and a combination thereof, wherein the halogen substituent may be one or two halogen atoms.

The invention includes all the stereoisomers and stereoisomeric mixtures of the compounds having the general formula I, not only in free base form but also their acid addition salts with pharmaceutically acceptable acids as well as their enantiomers and diastereoisomers.

Suitable representatives of the compounds of formula I are the following derivatives:

N-(3-nitrophenyl)-N'-(1,3-dihydroxy-1-/4'-nitrophenyl/-propyl-2)-formamidine;

N-(2-nitro-4-methoxyphenyl)-N'-(1,3-dihydroxy-1-/4'-nitrophenyl/-propyl-2)-formamidine;

N-(1-naphthyl)-N'-(1,3-dihydroxy-1-/4'-nitrophenyl/-propyl-2)-formamidine;

N-phenyl-N'-(1,3-dihydroxy-1-/4'nitrophenyl/-propyl-2)-formamidine;

N-(tolyl)-1,3-dihydroxy-1-/4'-nitrophenyl/-propyl-2)-formamidine;

N-(2,3-dichlorophenyl)-N'-(1,3-dihydroxy-1-/4'-nitrophenyl/-propyl-2)-formamidine;

N-(4-chlorophenyl)-N'-(1,3-dihydroxy-1-/4'-nitrophenyl/-propyl-2)-formamidine;

N-(3-chlorophenyl)-N'-(1,3-dihydroxy-1-/4'-nitrophenyl/-propyl-2)-formamidine; and N-(3-trifluoromethyl-phenyl)-N'-(1,3-dihydroxy-1-/4'-nitrophenyl/-propyl-2)-formamidine.

According to a further feature of the present invention there is provided a process for the preparation of the compounds of the general formula I, which comprises reacting 1-(4'-nitrophenyl)-2-amino-1,3-propanediol with a N-substituted formiminoether having the general formula $$R-N=CH-OR_1 \quad (II)$$

wherein R has the same meanings as stated above and $R_1$ stands for an alkyl group having from one to four carbon atoms.

The reaction is preferably carried out in a solvent, such as benzene and the like, at the boiling point of the reaction mixture. The reaction can be rendered nearly quantitative by distilling out the alcohol formed during the reaction. The alcohol may be removed from the system in the form of an azeotropic mixture, preferably under reduced pressure.

The new compounds according to the invention possess basic properties and form acid addition salts. If it is desired to obtain the acid addition salts from the free base, the salt can be prepared by reacting the free base with a pharmaceutically acceptable inorganic or organic acid, such as hydrochloric, hydrobromic, sulfuric, phosphoric, tartaric, lactic, acetic, salicylic, citric, p-toluene-sulfonic, mandelic acid or the like, preferably in the presence of a suitable solvent permitting isolation of the salt.

Due to the presence of two or more basic nitrogen atoms, the acid addition salts can be formed with one or more equivalents of the acid.

On the other hand, when it is desired to convert the acid addition salt to the free base, this can be accomplished by dissolving the salt in a suitable solvent, neutralizing the solution with a basic material, such as sodium hydroxide and the like, and isolating the desired base by extraction or other suitable means.

In compliance with a preferred embodiment of the process according to invention, the product obtained is directly transformed to a salt by reacting the free base without separation with the corresponding acid.

If the racemic 1-(4'-nitrophenyl)-2-amino-1,3-propanediol is used as starting compound, then the product obtained can be resolved with optically active acids in a way known per se. On the other hand, the products obtained in optically active form can be transformed, if desired, to racemic compounds with the aid of methods known per se.

The new compounds according to the invention have valuable pharmacological properties. Thus they show a powerful antimicrobial effect, e.g., against the following micro-organisms: *Proteus vulgaris*, *Proteus vulgaris Morganii*, *Pseudomonas aeruginosa*, *Pseudomonas aeruginosa* PR, *Pseudomonas aeruginosa* 11, *Bacillus subtilis* ATCC 6633, *Staphylococcus aureus Wood*, *Staphylococcus aureus Duncan* 1, *Staphylococcus aureus* V 170 PR, *Bacillus brevis*. The antimicrobial activity of the following compounds is especially significant: N-(2-nitro-4-methoxyphenyl)-N'-(1,3-dihydroxy-1-/4'-nitrophenyl/-propyl-2)-formamidine; N-(2,3-dichlorophenyl)-N'-(1,3-dihydroxy-1-/4'-nitrophenyl/-propyl-2)-formamidine; and N-(3-trifluoromethyl-phenyl)-N'-(1,3-dihydroxy-1-/4'-nitrophenyl/-propyl-2)-formamidine. The minimum inhibiting concentration of these compounds against *Bacillus brevis* amounts to 1:16,000 moles/liter.

The racemic and the optically active forms of the compounds according to the invention are equally potent.

The daily dose of the new compounds having the general formula I on adults amounts advantageously to 40–300 mg./kg., depending on the micro-organism and the degree of infection.

According to a further feature of the present invention there are provided pharmaceutical compositions comprising as active ingredient at least one compound of the formula I, wherein R has the same meanings as above, in admixture with suitable pharmaceutical carriers and/or excipients.

These pharmaceutical compositions may be solid, e.g., tablets, pills, coated pills, suppositories, capsules, or liquid, such as solutions, suspensions, emulsions or injectable preparations. The preparations may be suitable for oral, rectal or parenteral administration.

For oral use mainly tablets, capsules and pills are suitable. The active agent content in the oral preparates amounts advantageously to 20–80 percent. For parenteral use the acid addition salts of the compounds according to the invention as formed with nontoxic acids are especially suitable.

The carriers may be conventional organic or inorganic substances, such as starch, magnesium stearate, talc, stearine, water, polyalkylene glycols, magnesium carbonate, etc.

The pharmaceutical compositions may contain additives, such as emulsifying, stabilizing, disintegrating and wetting agents, etc. The preparation may comprise in addition to the compound of formula I further therapeutically active compounds.

The pharmaceutical compositions of the present invention may be prepared by usual methods known per se of the pharmaceutical industry by admixing the active ingredient with suitable solid or liquid organic or inorganic pharmaceutical carriers and/or excipients and, if desired, with other therapeutically active compounds.

Further details of the invention are to be found in the examples. It is, however, by no means intended to restrict the scope of the invention to the examples. Accordingly, the scope of

EXAMPLE 1

23.2 g. (0.1 moles) of L-1-(4'-nitrophenyl)-2-amino-1,3-propanediol dissolved in 600 ml. of ethanol are reacted at 50°–60° C. with 19.41 g. (0.1 moles) of N-(3-nitrophenyl)-formimino ethylether. After 4 hours the solution is evaporated and the obtained oily substance is treated with ethanol containing hydrochloric acid. The obtained L-N-(3-nitrophenyl)-N'-(1,3-dihydroxy-1-/4'-nitrophenyl/-propyl-2)-formamidine hydrochloride melts at 130°–132° C.

EXAMPLE 2

One proceeds as described in example 1 but as starting material D-1-(4'-nitrophenyl)-2-amino-1,3-propanediol is used. The obtained D-N-(3-nitrophenyl)-N'-(1,3-dihydroxy-1-/4'-nitrophenyl/-propyl-2)-formamidine hydrochloride melts at 119°–120° C.

EXAMPLE 3

23.2 g. (0.1 moles) of DL-1-(4'-nitrophenyl)-2-amino-1,3-propanediol and 22.4 g. (0.1 moles) of N-(2-nitro-4-methoxyphenyl)-formimino ethylether are reacted in 200 ml. of benzene at 30°–40° C. The ethanol formed during the reaction is distilled off as an azeotropic mixture formed with the benzene. After distilling off ethanol of the theoretical amount, the reaction mixture is freed from the solvent and the obtained oil is reacted with ethanol containing hydrochloric acid. The obtained DL-N-(2-nitro-4-methoxyphenyl)-N'-(1,3-dihydroxy-1-/4'-nitrophenyl/-propyl-2)-formamidine dihydrochloride melts at 135°–137° C.

EXAMPLE 4

23.2 g. (0.1 moles) of L-1-(4'-nitrophenyl-2-amino-1,3-propanediol is reacted with 20.1 g. (0.1 moles) of N-(1-naphthyl)-formimino ethylether in the way as described in example 1. The obtained free base is treated with ethanol containing hydrochloric acid. The product is L-N-(1-naphthyl)-N'-(1,3-dihydroxy-1-/4'-nitrophenyl/-propyl-2)-formamidine hydrochloride melting at 246°–247° C.

EXAMPLE 5

23.2 g. (0.1 moles) of D-1-(4'-nitrophenyl)-2-amino-1,3-propanediol is reacted with 14.9 g. (0.1 moles) of N-phenyl-formimino ethylether in the way as described in example 1, whereafter the obtained free base is transformed to hydrochloride salt melting at 212°–213° C. by reacting with ethanol containing hydrochloric acid.

EXAMPLE 6

23.2 g. (0.1 moles) of L-1-(4'-nitrophenyl)-2-amino-1,3-propanediol and 13.5 g. (0.1 moles) of N-(4-tolyl)-formimino ethylether are boiled for 4 hours in 500 ml. of ethanol, whereafter the solution is treated with charcoal. After filtration ethanol containing hydrochloric acid is added to the filtrate. The solvent is distilled off and the oily substance being left over is crystallized on cooling. The thus-obtained L-N-(4-tolyl)-(1,3-dihydroxy-1/4'-nitrophenyl/-propyl-2)-formamidine hydrochloride melts at 183°–185° C.

The The D-N-(4-tolyl)-N'-(1,3-dihydroxy-1-/4'-nitrophenyl/-propyl-2)-formamidine hydrochloride prepared in analogous way melts at 158°–159° C.

EXAMPLE 7

11.6 g. (0.05 moles) of L-1-(4'-nitrophenyl)-2-amino-1,3-propanediol and 10.9 g. (0.05 moles) of N-(2,3-dichlorophenyl)-formimino ethylether are reacted in 300 ml. of ethanol in the way as described in example 6. The thus-obtained L-N-(2,3-dichlorophenyl)-N'-(1,3-dihydroxy-1-/4'-nitrophenyl/-propyl-2)-formamidine hydrochloride melts at 206°–108° C.

The D-N-(2,3-dichlorophenyl)-N'-(1,3-dihydroxy-1-/4'-nitrophenyl/-propyl-2)-formamidine hydrochloride prepared in analogous way melts at 186°–188° C.

EXAMPLE 8

23.2 g. (0.1 moles) of DL-1-(4'-nitrophenyl)-2-amino-1,3'-propanediol and 18.4 g. (0.1 moles) of N-(4-chlorophenyl)-formimino ethylether are reacted in the way as described in example 6. The obtained DL-N-(4-chlorphenyl)-N'-(1,3-dihydroxy-1-/4'-nitrophenyl/-propyl-2-formamidine is resolved in ethanol with D-tartaric acid, whereafter the obtained L-N-(4'-chlorophenyl)-N'-(1,3-dihydroxy-1-/4'-nitrophenyl/-propyl-2)-formamidine is transformed to hydrochloride salt by treating with ethanol containing hydrochloric acid. The salt melts at 196°–198° C.;/α/$^{20}_D$=-22.0° (c=1, water). The D-N-(4-chlorophenyl)-N'-(1,3-dihydroxy-1-/4'-nitrophenyl/-propyl-2)-formamidine hydrochloride melts at 186°–188° C.; /α/$^{20}_D$ = −21.5°(c=1, water).

EXAMPLE 9

23.2 g. (0.1 moles) of D-1-(4'-nitrophenyl)-2-amino-1,3 -propanediol are reacted with 18.4 g. (0.1 moles) of N-(3-chlorophenyl)-formimino ethylether in the way as described in example 6. The obtained D-N-(3'-chlorophenyl)-N'-(1,3-dihydroxy-1-4'-nitrophenyl/-propyl-2)-formamidine hydrochloride melts at 173°–174° C.

EXAMPLE 10

23.2 g. (0.1 moles) of D-1-(4'-nitrophenyl)-2-amino- 1,3-propanediol and 21.7 g. (0.1 moles) of N-(3'-trifluoromethylphenyl)-formimino ethylether are reacted in the way as described in example 6. The obtained D-N-(3-trifluoromethylphenyl)-N'-(1,3'-dihydroxy-1-/4'-nitrophenyl/-propyl-2)-formamidine hydrochloride melts at 158°–160° C.

The levorotatory isomer prepared in analogous way melts at 162°–164° C.

What we claim is:

1. A compound selected from the group consisting of

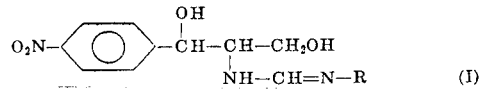

(I)

wherein R is a member selected from the group consisting of naphthyl, phenyl, monosubstituted phenyl, dihalophenyl and nitro-lower alkoxy-phenyl, the substituent of the monosubstituted phenyl group being selected from the group consisting of halogen, lower alkyl, lower alkoxy, trihalomethyl and nitro, and acid addition salts thereof with pharmaceutically acceptable acids.

2. N-(2-nitro-4-methoxyphenyl)-N'-(1,3-dihydroxy-1-/4'-nitrophenyl/-propyl-2)-formamidine.

3. N-(2,3-dichlorophenyl)-N'-(1,3-dihydroxy-1-/4'-nitrophenyl/-propyl-2)-formamidine.

4. N-3trifluormethylphenyl)-N'-(1,3-dihydroxy-1-/4'-nitrophenyl/-propyl-2)-formamidine.

* * * * *